United States Patent [19]

Velasco

[11] 4,278,695

[45] Jul. 14, 1981

[54] PREPARING BEVERAGE MIX CONTAINING DEXTROSE HYDRATE AND COATED CITRIC ACID

[75] Inventor: Violeta S. Velasco, Bolingbrook, Ill.

[73] Assignee: CPC International Inc., Englewood Cliffs, N.J.

[21] Appl. No.: 116,981

[22] Filed: Jan. 16, 1980

Related U.S. Application Data

[63] Continuation of Ser. No. 965,827, Dec. 4, 1978, abandoned.

[51] Int. Cl.[3] .................... A23L 1/221; A23L 2/00
[52] U.S. Cl. ........................... 426/289; 426/96; 426/295; 426/510; 426/650
[58] Field of Search ............... 426/96, 93, 650, 103, 426/289, 591, 590, 592, 599, 541, 569, 295

[56] References Cited

U.S. PATENT DOCUMENTS

| | | | |
|---|---|---|---|
| 856,673 | 6/1907 | Best et al. | 426/96 |
| 2,332,735 | 10/1943 | Lyons | 426/590 |
| 2,970,056 | 1/1961 | Benson et al. | 426/96 |
| 3,023,106 | 2/1962 | Common | 426/98 |
| 3,328,173 | 6/1967 | Van Ness et al. | 426/590 |
| 3,330,665 | 7/1967 | Van Ness et al. | 426/590 |
| 3,397,063 | 8/1968 | Carlson et al. | 426/90 |
| 3,715,216 | 2/1973 | Wuhrmann et al. | 426/590 |
| 3,975,547 | 8/1976 | D'Ercole | 426/106 |

*Primary Examiner*—Joseph M. Golian
*Assistant Examiner*—Elizabeth J. Curtin

[57] ABSTRACT

A dry, free-flowing beverage mix and a process for its preparation are described. The method of preparation comprises coating the particles of a food acid with a desiccating agent and then mixing the coated food acid particles with a saccharide material and other dry beverage mix ingredients.

1 Claim, No Drawings

PREPARING BEVERAGE MIX CONTAINING DEXTROSE HYDRATE AND COATED CITRIC ACID

This application is a continuation of application Ser. No. 965,827, filed Dec. 4, 1978, now abandoned.

BACKGROUND OF THE INVENTION

This invention relates to an improved dry beverage mix containing dextrose hydrate and a method for its preparation.

Dry beverage mixes containing flavor, food acid, color, sucrose and minor amounts of various other additives are well-known articles of commerce. In the production of such articles of commerce, it would be desirable to replace part of the sucrose of the mixes with the less-expensive sugar, dextrose. This presents a problem since the dextrose of commerce is the monohydrate containing 8–9% water of crystallization. When all or part of the sucrose in beverage mixes is replaced with dextrose hydrate, the mixes tend to cake and lose their free-flowing properties. Color and flavor changes often result.

One way to overcome this problem is described in U.S. Pat. No. 3,975,547, issued Aug. 17, 1976. In this process, dextrose hydrate is dried to remove nearly all of the water crystallization. Beverage mixes are then prepared in which part of the sucrose is replaced with the dried dextrose. Care must be taken to handle the dextrose under controlled relative humidity packaging and it is often necessary to have packets of a drying agent mixed with the dried dextrose to prevent its adsorption of moisture during the mixing process. This method requires the expensive step of drying of the dextrose monohydrate. Furthermore, the hygroscopic dehydrated sugar must be handled under special conditions adding to the cost.

BRIEF STATEMENT OF THE INVENTION

It is an objective of the present invention to provide a method whereby part of the sucrose may be replaced with the economical and readily handled dextrose monohydrate without the need to go through the expensive drying and handling process of the prior art and yet to obtain a dry free-flowing beverage mix which is readily handled and when packaged shows no tendency to agglomerate or cake.

The invention discloses a method for preparing a dry, free-flowing beverage mix which comprises coating the particles of a food acid with a desiccating agent and then mixing the coated food acid with a saccharide material which comprises dextrose hydrate. A novel beverage mix prepared by this process is also disclosed.

DETAILED DESCRIPTION OF THE INVENTION

The principle constituent of the free-flowing beverage mix of this invention is a water-soluble saccharide material. The saccharide material comprises dextrose hydrate. The saccharide material may contain in addition other monosaccharides, disaccharides, polysaccharides, or mixtures of several saccharides. It is essential, however, that the saccharide material be very soluble in water at room temperature. By very soluble is meant a solubility such that the solution will contain at least about 10% by weight of dissolved solids and preferably about 40–50% by weight of dissolved solids at room temperature. Preferred saccharides are sucrose, dextrose and low D.E. corn syrup solids but other of the water-soluble edible saccharides may be employed. The amount of saccharide material in the mix may vary from 80 to 98% by weight of the total mixture. More commonly it is in the range of 89 to 95% by weight of the total mixture.

The food acids of this invention can consist of any edible solid food acid such as citric, malic, adipic, tartaric or fumaric acids. The amount of food acid used in the preparation will vary with the desired flavor of the beverage mix. It is usually within the range of 1 to 6% by weight of the total mix.

Minor amounts of desiccating agents, i.e., from about 0.3% to about 2.0% by weight of the beverage mix are employed. Suitable desiccating agents include tricalcium phosphate, magnesium carbonate, sodium silicoaluminate, calcium silicate, silicon dioxide, and a starch hydrolyzate of a dextrose equivalent (D.E.) less than 20. Sodium silicoaluminate and silicon dioxide with mean particle diameters of less than 100 millimicrons, preferably less than 50 millimicrons are the preferred desiccating agents with silicon dioxide being the most preferred desiccating agent.

Other minor constituents can be added as desired to give suitable flavoring, color and texture. These may include one or more of the following components: clouding agents, thickening agents, vitamins, colors and flavors. The use of such components is well known in the art as indicated by U.S. Pat. No. 3,023,106, issued Feb. 27, 1962, U.S. Pat. No. 3,397,063, issued Aug. 13, 1968 and U.S. Pat. No. 3,975,547 referred to above.

When dextrose monohydrate is used as all or part of the saccharide material in the beverage mix, the particles soon agglomerate. After several weeks of storage, the mixture cakes so severely that it is difficult to remove the material from its container. The coloring agent in such a mix often migrates forming spots of concentrated color which give an undesirable speckled appearance to the product. Addition of a known desiccating agent to the mix does not solve the caking and color migration problem.

I have discovered a process that overcomes these problems and permits the use of dextrose monohydrate as a replacement for from about 5% to about 25% by weight of the saccharide component of the mix. The unexpected discovery is that if the food acid is first coated with a very finely divided desiccating agent, and this coated acid is mixed with the beverage mix containing dextrose monohydrate, severe caking of the mixture and migration of the color is avoided. The ingredients can be mixed in any order as long as the acid is first coated with the desiccating agent. This discovery is better understood by reference to the following examples.

COMPARATIVE EXAMPLE

A mixture of 90 g of sucrose, 5 g of dextrose monohydrate and 5 g of citric acid was mixed thoroughly and stored in a glass-stoppered bottle for 12 weeks at 32° C. The mixture became caked in the bottle. The procedure was repeated except that 0.7 g of finely divided tricalcium phosphate was added to the mixture. Severe agglomeration of the particles was observed. This example shows that the addition of the desiccating agent, tricalcium phosphate, to a mixture of sucrose, dextrose monohydrate and citric acid, fails to prevent agglomeration of the particles of the mix.

ide, 80% sucrose, 9% dextrose monohydrate, 0.75% color and 4.25% flavor base.

TABLE I

| | STORAGE TEST AT 32° C. | | | | | | | |
|---|---|---|---|---|---|---|---|---|
| | Saccharide | | | | | | | |
| Batch No. | Sucrose | Dextrose Mono-Hydrate | Citric Acid | Desic-cating Agent | Color | Flavor Base | Test Results (F.F. = Free Flowing) | |
| | (Weight in Grams) | | | | | | 8 Weeks | 2 Weeks |
| 1 | 1620 | 180 | 100 | None | 15 | 85 | Caked Agglomerated | Caked Agglomerated |
| 2 | 1611 | 179 | 100 | 10[a] | 15 | 85 | F.F.[d] | F.F.[d] |
| 3 | 1602 | 178 | 100 | 20[a] | 15 | 85 | F.F. | F.F.[e] |
| 4 | 1611 | 179 | 100 | 100[b] | 15 | 85 | F.F. | F.F.[d] |
| 5 | 1611 | 179 | 100 | 10[c] | 15 | 85 | F.F.[d,f] | F.F.[d] |
| 6 | 1602 | 178 | 100 | 20[c] | 15 | 85 | F.F.[d,f] | F.F.[d] |

[a]ZEOFREE 80, a product of the J. M. Huber Corp., P.O. Box 310, Havre de Grace, MD, a hydrated silicon dioxide with a mean particle diameter of 14–22 millimicrons, a surface area of 120–150 $M^2/g$ and showing a heat loss of 7% on heating for 2 hours at 105° C.
[b]ZEOLEX 23A, a product of the J. M. Huber Corp., P.O. Box 310, Havre de Grace, MD, a sodium silicoaluminate with a mean particle diameter of 35–45 millimicrons, a surface area of 65–80 $M^2/g$ and showing a heat loss of 8% when heated for 2 hours at 105° C.
[c]MOR-REX 1908, a product of CPC International Inc., International Plaza, Englewood Cliffs, NJ, a 5 D.E. starch hydrolyzate.
[d]A few small agglomerates on the surface of the mix.
[e]Very few agglomerates noted on the surface.
[f]Agglomerates were observed after 4 weeks of storage.

EXAMPLE

A mixture of 100 grams of citric acid and the specified amount of desiccating agent was tumbled manually in a 3.8-liter sealed jar for 5 minutes. The resulting mixture was added to the other ingredients in a Patterson-Kelley Twin Shell Dry Blender, Model LB-4226, manufactured by the Patterson-Kelley Corporation, East Strousburg, Pennsylvania. Mixing was continued for 20 minutes before the solid was stored in glass-stoppered bottles. Mixing operations were carried out at 21° C., at 50% or less relative humidity. Caking tests were carried out on the material stored in glass-stoppered bottles at 32° C. Test results given in the table show that dextrose hydrate can be used in beverage mixes without drying if the citric acid present is first treated with a desiccating agent before it is mixed with the major ingredients of the mixture. Best results were given by Batch 3 which contained 5% citric acid coated with 1% silicon diox-

What is claimed is:
1. A method for preparing a dry, free-flowing beverage mix which comprises:
   a. coating particles of citric acid with a powdered desiccating agent selected from the group consisting of silicon dioxide with a mean particle diameter of less than 50 millimicrons and sodium silicoaluminate with a mean particle diameter of less than 50 millimicrons; and
   b. mixing the coated acid with a flavoring agent and a saccharide material containing from 5% to 25% by weight of dextrose hydrate, said saccharide material being sufficiently water soluble at room temperature to form a water solution containing at least about 10% by weight of dissolved solids, which beverage mix includes 1% to 6% by weight of citric acid and about 0.3% to about 2% by weight of the powdered desiccating agent.

* * * * *

UNITED STATES PATENT AND TRADEMARK OFFICE
CERTIFICATE OF CORRECTION

PATENT NO. : 4,278,695

DATED : July 14, 1981

INVENTOR(S) : Violeta S. Velasco

It is certified that error appears in the above-identified patent and that said Letters Patent are hereby corrected as shown below:

Column 4, Table I, under heading "Desiccating Agent" for Batch 4, delete "100$^b$" and insert --10$^b$--.

Column 4, Table I, under heading "Test Results" last column, delete "2 Weeks" and insert --12 Weeks--.

Signed and Sealed this

Twenty-second Day of June 1982

[SEAL]

Attest:

GERALD J. MOSSINGHOFF

Attesting Officer     Commissioner of Patents and Trademarks